(12) United States Patent
Gardner

(10) Patent No.: US 7,432,452 B2
(45) Date of Patent: Oct. 7, 2008

(54) SNAP-IN CONNECTOR FOR ELECTRICAL JUNCTION BOX

(75) Inventor: Michael J. Gardner, Hudson, OH (US)

(73) Assignee: Halex/Scott Fetzer Company, Bedford, OH (US)

( * ) Notice: Subject to any disclaimer, the term of this patent is extended or adjusted under 35 U.S.C. 154(b) by 0 days.

(21) Appl. No.: 11/557,994

(22) Filed: Nov. 9, 2006

(65) Prior Publication Data

US 2007/0278006 A1 Dec. 6, 2007

Related U.S. Application Data

(63) Continuation-in-part of application No. 11/422,097, filed on Jun. 5, 2006, now abandoned.

(51) Int. Cl.
*H02G 3/18* (2006.01)

(52) U.S. Cl. .............. 174/650; 174/665; 174/663; 174/680; 16/2.1; 16/2.2; 439/939

(58) Field of Classification Search ............... 174/480, 174/481, 50, 665, 654, 653, 659, 660, 152 G, 174/153 G, 668, 658, 68.1, 657, 655; 16/2.1, 16/2.2; 439/94, 95, 96, 101, 108, 609, 939, 439/604, 587, 274, 275, 557, 535, 538, 552
See application file for complete search history.

(56) References Cited

U.S. PATENT DOCUMENTS

| | | | |
|---|---|---|---|
| 3,609,641 A | 9/1971 | Luce et al. | |
| 4,012,578 A | 3/1977 | Moran et al. | |
| 4,198,537 A | 4/1980 | Mariani | |
| 4,549,755 A | 10/1985 | Kot et al. | |
| 4,836,580 A | 6/1989 | Farrell | |
| 4,885,429 A | 12/1989 | Schnittker | |
| 4,990,721 A | 2/1991 | Sheehan | |
| 4,995,832 A | 2/1991 | Thommen et al. | |
| 5,683,117 A | 11/1997 | Corbett et al. | |
| 5,707,193 A | 1/1998 | Hasegawa | |
| 5,731,543 A | 3/1998 | Jorgensen | |
| 5,732,984 A | 3/1998 | Bartholomew | |
| 6,020,557 A | 2/2000 | Jorgensen | |
| 6,034,325 A | 3/2000 | Nattel et al. | |
| 6,034,326 A | 3/2000 | Jorgensen | |
| 6,043,432 A | 3/2000 | Gretz | |
| 6,080,933 A | 6/2000 | Gretz | |
| 6,114,630 A | 9/2000 | Gretz | |
| 6,133,529 A | 10/2000 | Gretz | |
| 6,335,488 B1 | 1/2002 | Gretz | |
| 6,355,884 B1 | 3/2002 | Gretz | |

(Continued)

*Primary Examiner*—Angel R Estrada
(74) *Attorney, Agent, or Firm*—Pearne & Gordon LLP

(57) ABSTRACT

In a snap-in electrical connector for attaching helical metal cable and conduit to a junction box or the like, the connector having the locking ring with flexible tabs engageable with the cable/conduit, the improvement wherein the tabs have legs angled inwardly of the ring at specified angles, tips that form specified angles with the legs, and tip ends that are biased relative to the legs in the same direction. The specified angles of the legs, tips and tip ends provide improved pull-out strength, electrical conductivity and stability for a wide range of sizes and types of cable and conduit, including metal clad cable, armored cable, and flexible metal conduit, made of aluminum and steel.

13 Claims, 6 Drawing Sheets

U.S. PATENT DOCUMENTS

| | | |
|---|---|---|
| 6,380,483 B1 | 4/2002 | Blake |
| 6,444,907 B1 | 9/2002 | Kiely |
| 6,555,750 B2 | 4/2003 | Kiely |
| 6,604,400 B1 | 8/2003 | Gretz |
| 6,682,355 B1 | 1/2004 | Gretz |
| 6,737,584 B2 | 5/2004 | Kiely |
| 6,827,604 B1 | 12/2004 | White |
| 6,872,886 B2 | 3/2005 | Kiely |
| 7,060,900 B1 | 6/2006 | Gretz |
| 7,064,272 B2 | 6/2006 | Auray et al. |
| 7,151,223 B2 * | 12/2006 | Auray et al. ............ 174/480 |
| 7,154,042 B2 * | 12/2006 | Auray et al. ............ 174/480 |

* cited by examiner

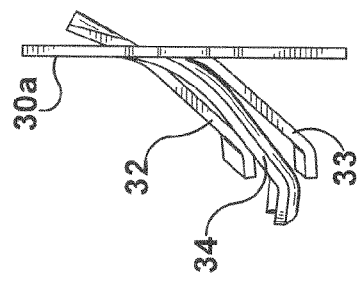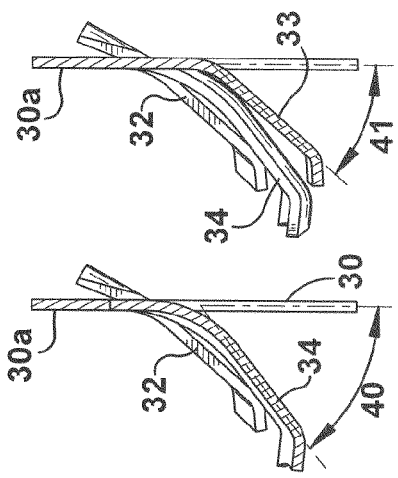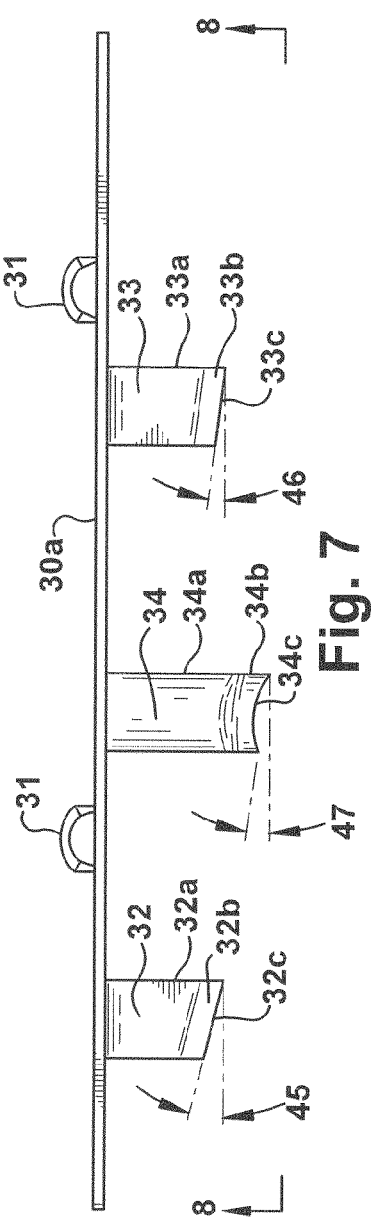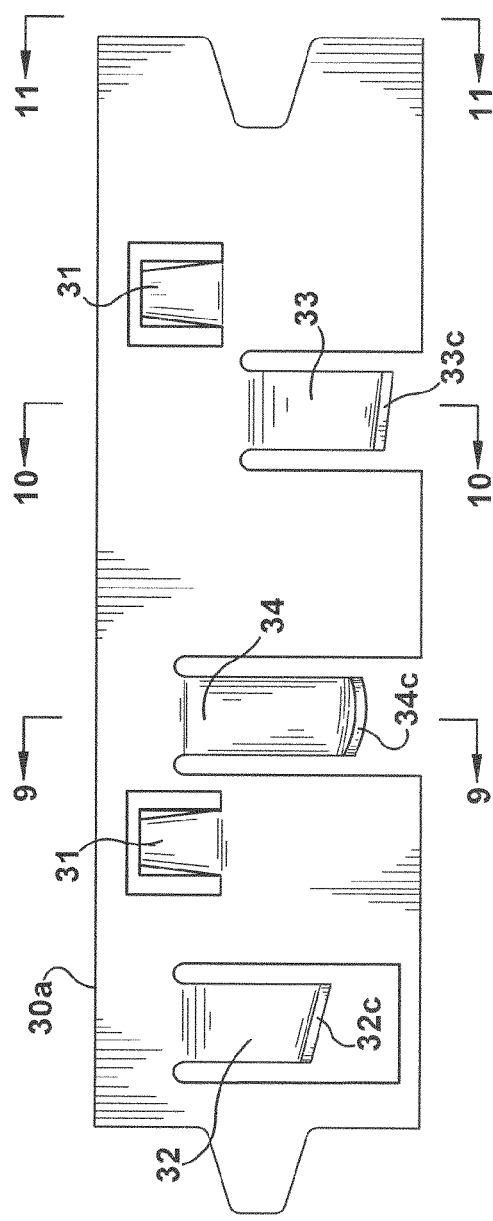

SNAP-IN CONNECTOR FOR ELECTRICAL JUNCTION BOX

CROSS-REFERENCE TO RELATED APPLICATION

This application is a Continuation-In-Part of U.S. patent application Ser. No. 11/422,097 filed Jun. 5, 2006, and is incorporated herein by reference in its entirety.

FIELD OF THE INVENTION

The present invention relates generally to electrical connectors, and more specifically to a new and improved snap-in connector for electrical junction boxes and the like.

BACKGROUND OF THE INVENTION

The invention is particularly concerned with improvements in snap-in connectors for helical metal cable and conduit, such as metal-clad cable, armored cable and flexible metal conduit. A known connector of this type generally includes a cylindrical body having a leading end that snaps into a hole in the junction box, a trailing end that receives the helical cable/conduit, and inwardly extending, flexible fingers or tangs that are intended to seat in the helical grooves to lock the cable/conduit in the connector body and establish electrical contact.

Underwriters Laboratories Standard 514B requires connectors of the type described to pass several stringent performance tests. One test requires the connector to resist a cable pull-out force of 75 pounds for 5 minutes. Another test measures the electrical resistance of the cable/connector assembly when installed in a junction box. In this test, the voltage drop from the outside of the cable/conduit to the junction box should not exceed 50 millivolts.

Tests conducted on commercially available cable connectors as described above have not met one or more of the desired requirements. This is due in large part to the fact that the cable tangs or fingers do not seat properly in the helical grooves of the cable/conduit. The failure of the tangs to seat in the helical grooves results in poor pull-out strength and poor electrical contact so that the voltage drop across the cable/fitting interface exceeds 50 millivolts.

SUMMARY OF THE INVENTION

An object of the invention is to provide a snap-in electrical connector for helical metal cable and conduit which meets the desired industry performance standards.

A more particular object of the invention is to provide a snap-in electrical connector for helical metal cable and conduit characterized by improved cable gripping tabs that are designed to maximize engagement of the tabs in the helical cable/conduit groove, thereby providing improved electrical contact and higher and more consistent pull-out strength than prior art designs.

The snap-in electrical connector of the invention generally comprises a body having a longitudinal axis, a leading end engageable in a hole of a junction box, a trailing end for receiving a helical cable or conduit, an inner cylindrical wall defining a locking ring chamber, and a spring steel locking ring in the chamber. The locking ring includes outwardly extending tabs engaged in holes in the cylindrical wall of the connector body, and inwardly extending cable/conduit engaging tabs including trailing and leading tabs that extend toward each other, and a middle tab between the trailing and leading tabs.

The invention is based on the discovery that it is possible to attain consistently high pull-out strength by making a connector of the type described with cable engaging tabs having a combination of specific properties of thickness, hardness and angular directions.

In accordance with one embodiment of the invention, the tabs are made from 0.020 inch gauge 1074 spring steel having a hardness in a range of about 45-50 Rockwell C. In order to maximize the engagement of the tabs in the cable/conduit groove, each tab has a leg portion forming an included angle with the ring of about 35°-55°, a tip forming an included angle with the leg of about 135°, and a tip end. The tabs are spaced along the longitudinal axis of the connector body so that the tip ends are engageable in the helical groove of the cable/conduit.

One critical aspect of the invention is the form of the tip ends of the tabs. The tip ends are biased in the same direction in order to maximize engagement in the helical groove of the cable/conduit. In a specific example hereinafter described, the biased tips form angles in a range from about 9° to 20°.

The middle tab is longer than the other tabs and preferably has a concave or scalloped end face. The concave end face presents two points of engagement with the bottom of the helical groove that is captured by all of the tabs.

The spacing of the tabs is optimized so that the tabs can engage in all types of cable/conduits, i.e. metal-clad cable, armored cable and flexible metal conduit made of steel and aluminum. The angle directions of the ends of the tabs, including the bias angles, are such as to capture and firmly engage in the helical grooves of wide range cable/conduit sizes.

BRIEF DESCRIPTION OF THE DRAWINGS

FIG. 7 is an edge elevational view of a partially formed blank used to form the locking ring of FIGS. 5 and 6.

FIG. 8 is plan view taken in the plane of the line 8-8 of FIG. 7.

FIG. 9 is a cross-sectional view taken in the plane of the line 9-9 of FIG. 8.

FIG. 10 is a cross-sectional view taken in the plane of the line 10-10 of FIG. 8.

FIG. 11 is an end elevational view taken in the plane of the line 11-11 of FIG. 8.

DESCRIPTION OF PREFERRED EMBODIMENTS

Figure 1:
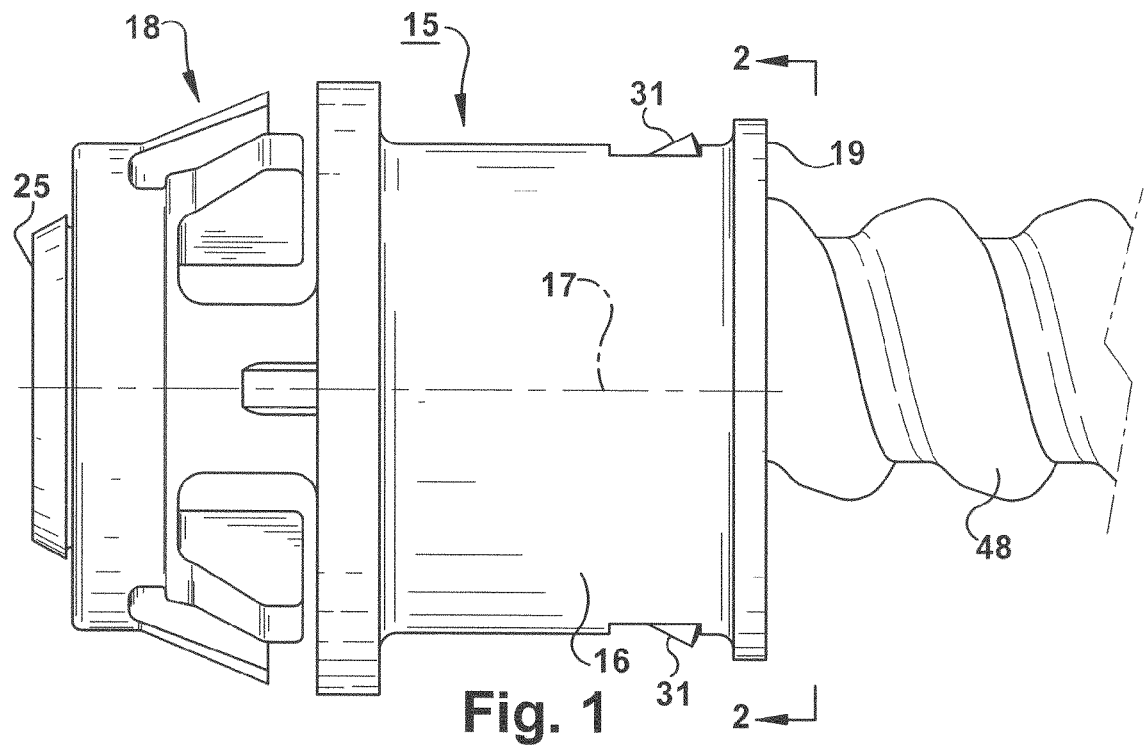
FIG. 1 is a side elevational view of the new snap-in electrical connector of the invention with a helical cable inserted into the connector from its trailing end.

Referring now to the drawings and to FIGS. 1-12 in particular, the new snap-in connector embodying the present invention is generally indicated by reference numeral 15 in FIG. 1. The connector 15 includes a cylindrical body 16 having a longitudinal axis 17, a leading end 18 and a trailing end 19.

The leading end or nose 18, which does not form a part of the present invention, may be constructed as disclosed in U.S. Pat. No. 6,827,604, the disclosure of which is incorporated by reference, to provide a quick-connect snap-in connection when pushed through an opening of a junction box. The end opening of the nose 18 is shown provided with an insulated bushing 25. In FIGS. 1-4, reference numeral 48 designates a helical metal cable or conduit that is engaged in the connector 15 in a manner to be described. The cable/conduit wires (not shown) pass through the connector and the bushing 25.

Figure 2:
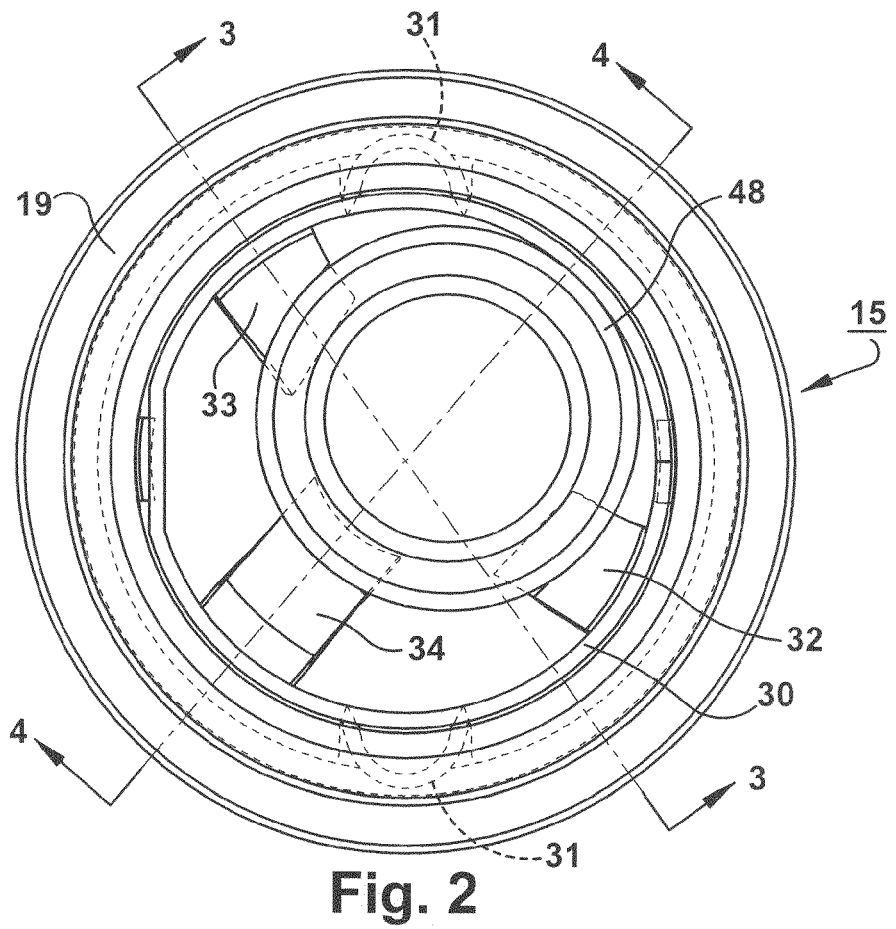
FIG. 2 is an end elevational view taken in the plane of the line 2-2 of FIG. 1.
Figure 3:
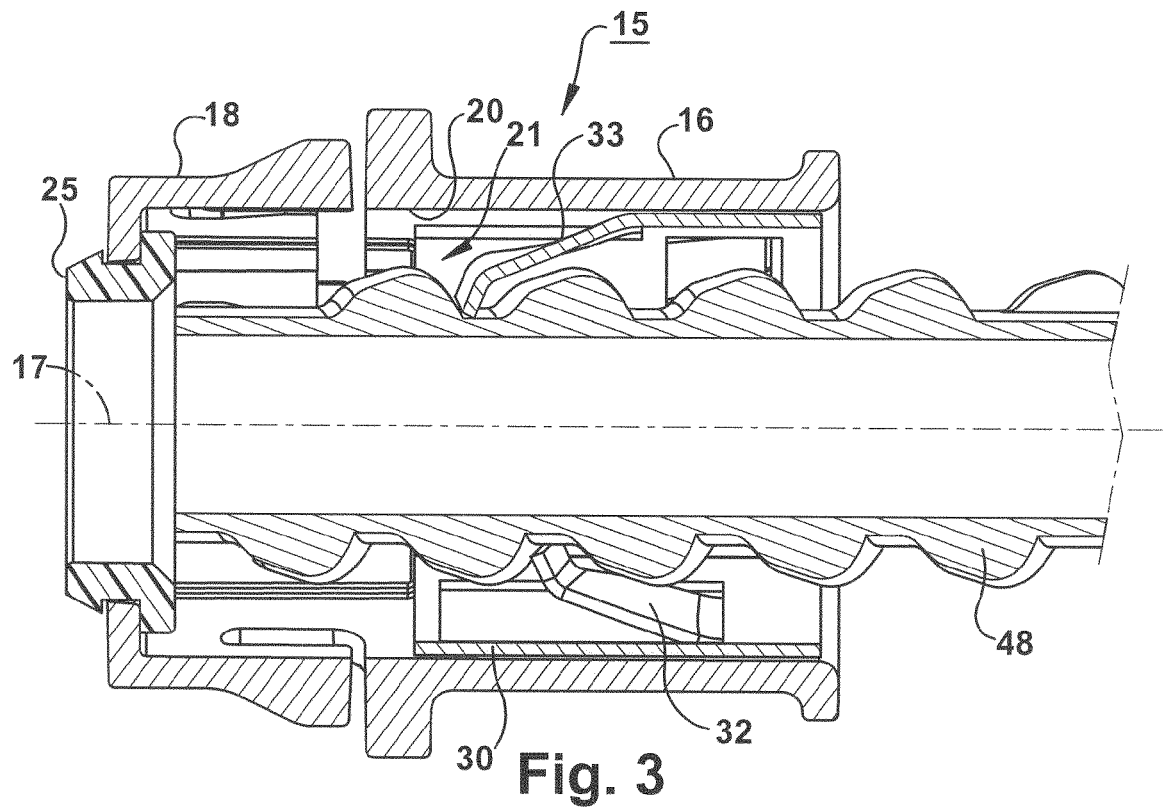
FIG. 3 is a cross-sectional view taken in the plane of the line 3-3 of FIG. 2.
Figure 4:
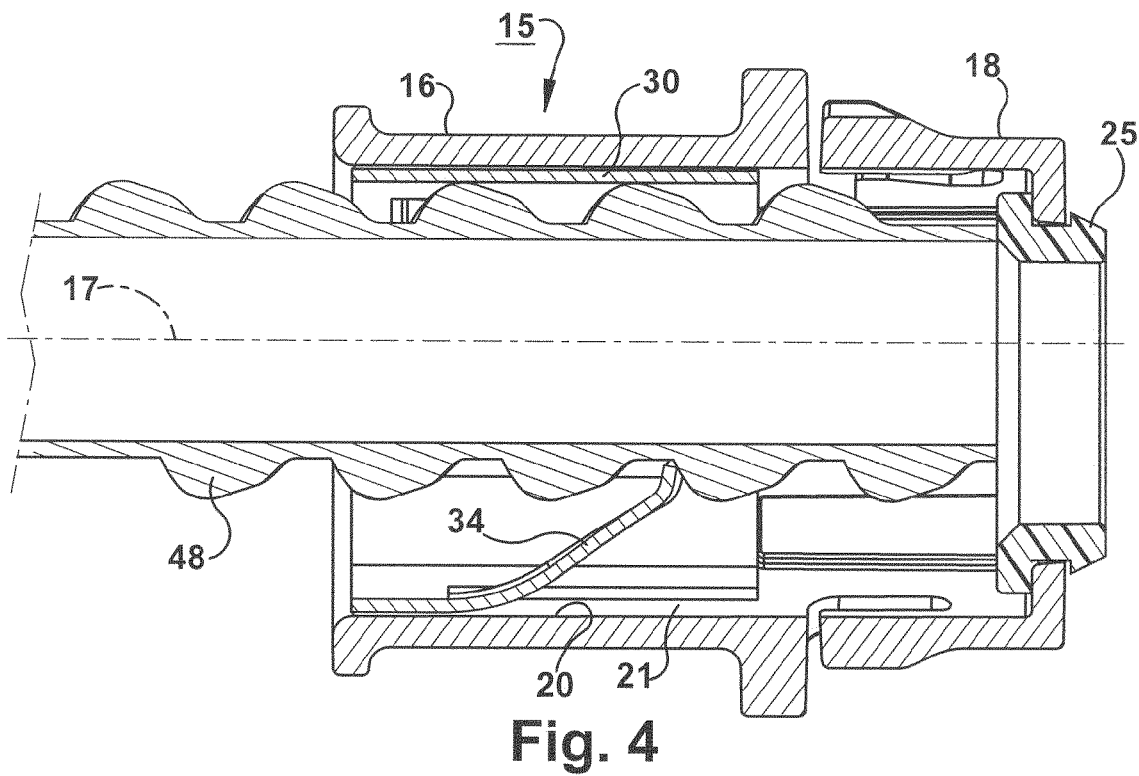
FIG. 4 is a cross-sectional view taken in the plane of the line 4-4 of FIG. 2.
Figure 5:
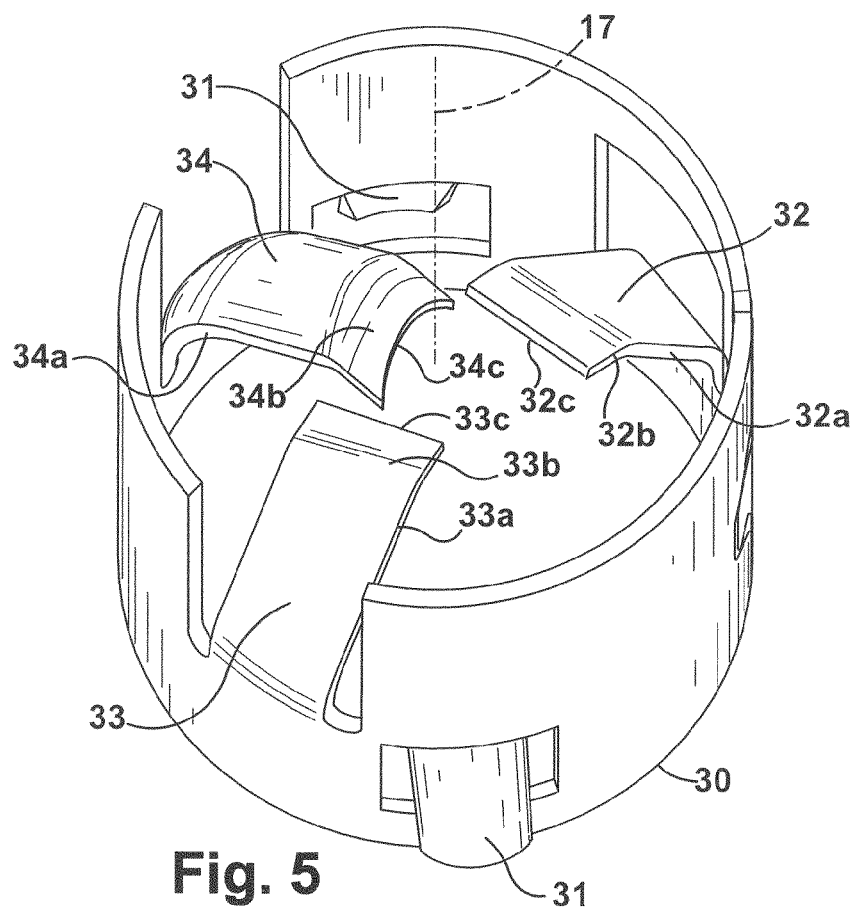
FIG. 5 is a perspective view of a spring steel locking ring made according to the invention.
Figure 6:
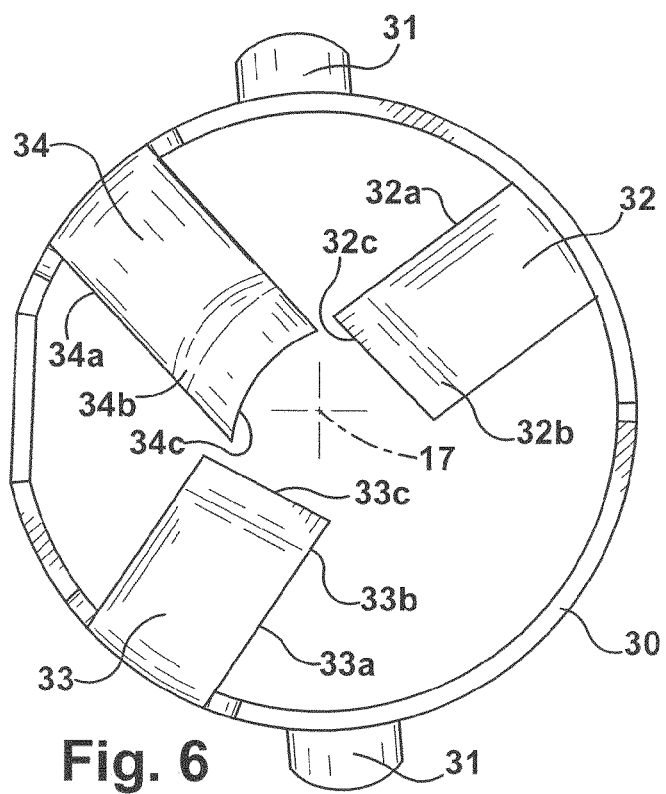
FIG. 6 is an end elevational view of the locking ring shown in FIG. 5.

The connector body 16 has a cylindrical wall 20 that defines a locking ring chamber 21. A spring steel locking ring 30 is engaged in the chamber 21. As shown in FIGS. 2-4, the locking ring 30 includes outwardly extending tabs 31 that are engaged in holes in the cylindrical wall 20 of the connector body 16. In the illustrated construction, the side edges of the tabs 31 are bent toward each other to form a concavo-convex shape in order to enhance their columnar strength.

The locking ring 30 has flexible, inwardly extending tabs that engage and lock a helical cable/conduit in the connector 15. These tabs include a leading tab 32 and a trailing tab 33 on either side of the longitudinal axis 17. A middle tab 34 is located between the tabs 32, 34. The tabs 32-34 are spaced along the axis 17 by a distance determined by the helical angle of the cable/conduit so that all three tabs will seat in the helical groove.

The tabs 32-34, respectively, have leg portions 32a, 33a, 34a and angularly extending tips 32b, 33b, 34b that terminate in tip ends 32c, 33c, 34c. As most clearly shown in FIGS. 7 and 8, the tip ends 32c, 33c, 34c are biased in the same angular direction. This assures that the tip ends will engage the bottom of the helical groove of cable/conduit of different sizes. The corners of the tip ends 32c, 33c, 34c may be radiused in order to prevent the corners from damaging the insulation of the conductor wires of the cable/conduit 48 that are pulled through the connector 15 and the bushing 25.

The spacing of the tabs 32, 33, 34, the angularity of the tabs relative to the ring 30, the angle of the tips 32b, 33b, 34b, and the bias angle of the tip ends 32c, 33c, 34c are important in order that the tab ends can be captured in the helical grooves of a full range of cable/conduit sizes, for example, cable diameters ranging from 0.405-0.612 in diameter, and will engage the bottoms of the helical grooves to provide good electrical contact and high pull-out resistance.

The high pull-out strength of the connector 15 is further enhanced by the formation of the middle tab 34. As shown, it is concavo-convex lengthwise and is longer than the tabs 32, 33 which results in the cable/conduit being forced toward the wall 20 of the connector body. The concavo-convex shape of the middle tab adds to its columnar strength so that it firmly holds the cable/conduit in place in the connector body. The tip end 34c is concave. The concave tip end provides two-point contact with the bottom of the helical cable/conduit groove. This two-point contact is important in achieving good pull-out strength and stability, as will better electrical conductivity.

Specific examples of the invention are as follows:

In the following examples, the ring 30 is made of spring steel, preferably, 1074 grade steel, having a thickness and hardness of 0.020 inch gauge and 45-50 Rockwell C. The physical properties of the ring, in combination with the angle directions of the tabs 31-34, are responsible for the high pull-out strength of the connector 15.

The specific angularity of the tabs 32-34 relative to the ring 30 is a compromise between high pull-out strength and electrical conductivity on the one hand and ease of inserting the cable or conduit 48 on the other hand. A steep angle of the tabs results in optimum pull-out strength and electrical conductivity, but makes it more difficult to engage the cable/conduit between the tabs. Shallower tab angles make it easier to insert the cable/conduit, but decrease the pull-out strength and conductivity. In the example of the invention, the tabs and ring form included angles in a range from about 35°-55°, and, more particularly, from 37°-52°.

Referring to FIGS. 9 and 10, the tab 34 is shown as forming an included angle 40, and the tab 33 is shown to form an included angle 41. The included angle formed by the tab 32 may be the same as that formed by the tab 33. In one example of the invention exhibiting high pull-out strength and conductivity, the angle 40 is about 52° and the angle 41 is about 42°. According to another example characterized by easier insertion of the cable/conduit, the angle 40 may be about 45° and the angle 41 about 37°.

Each of the tips 32b, 33b, 34b is bent inwardly of the leg portions 32a, 33a, 34a to form included angles of about 135°. The bias angles of the tip ends 32c, 33c, 34c are shown in FIG. 7 and range from about 9° to 20°. A specific angle 45 of the tip end 32c is about 20°, the bias angle 46 of the tip 33 is about 10°, and the bias angle 47 of the middle tab tip end 34c is about 9°.

A partially formed, spring steel blank is shown in FIGS. 7-11. These drawings show the angularity of the tabs 31-34, the angularity of the tips 32b, 33b, 34b, and the bias angles of the tip ends 32c, 33c, 34c. Because the tip ends are biased in the same angular direction, they face the same helical direction when the blank is bent into a ring.

Figure 12:
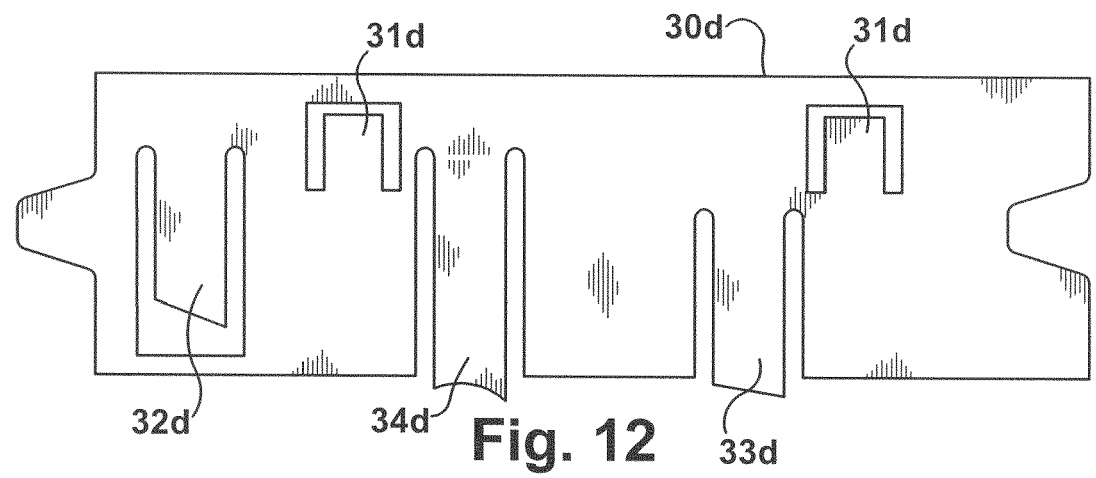
FIG. 12 is a plan view of a blank prior to being formed to the shape of FIG. 8

FIG. 12 shows a blank prior to being partially formed to the shape of FIG. 8. The tab forming portions are designated by reference characters 32d, 33d, and 34d, and the portions forming the locking tabs 31 are designated by reference character 31d. As described previously, the locking ring 30 is inserted in the body 16 from its trailing end 19 so that the tabs 32-34 are directed inwardly toward the leading end or nose 18 of the connector. An electrical cable or conduit 48 is then inserted through the trailing end of the connector with the cable wires (not shown) extending out through the insulating bushing 25.

Figure 13:
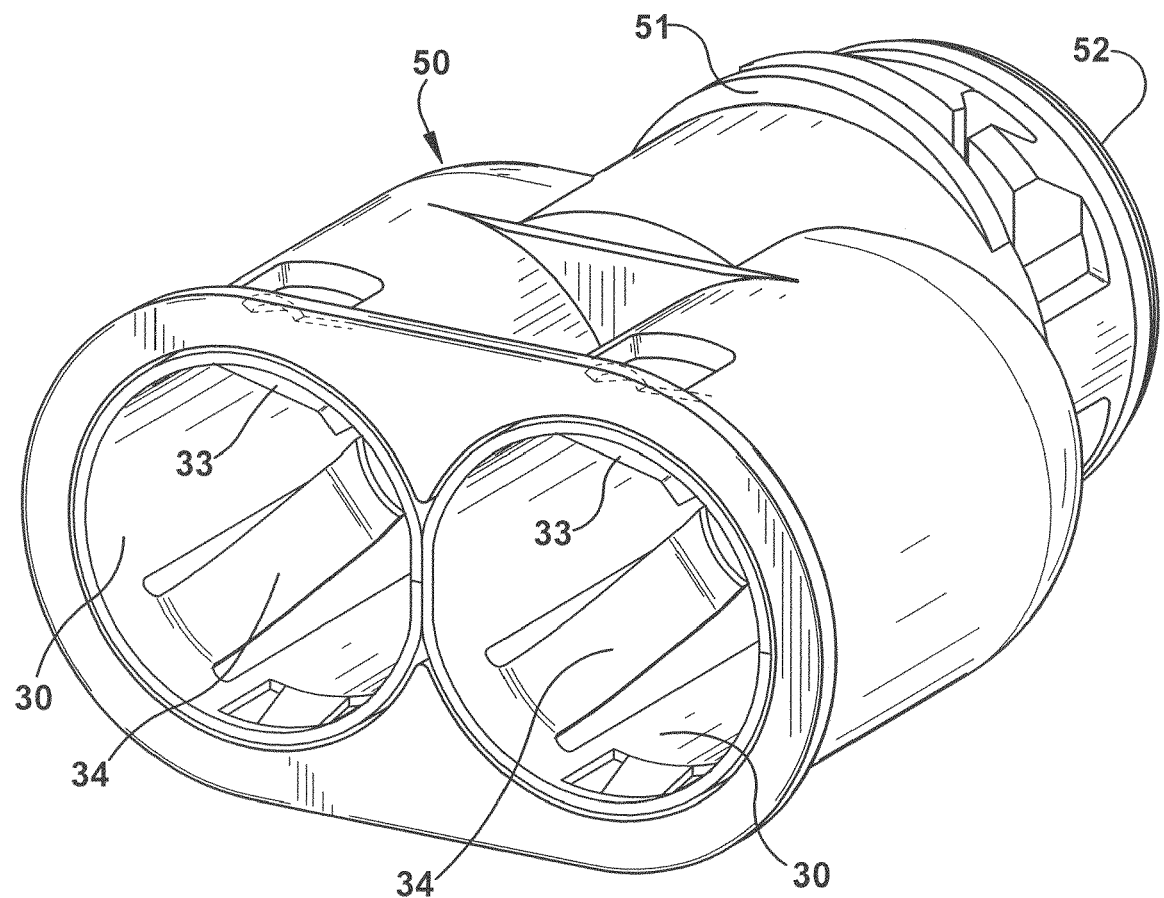
FIG. 13 is an elevational view of a duplex connector embodying two locking rings of the construction shown in FIGS. 5 and 6.

FIG. 13 shows a duplex snap-in connector 50 which receives two helical metal conduits or cables. The connector 50 has a leading end 51 that is similar to the leading end of the connector 15 described above, and a trailing end. The leading end 51 may be provided with an insulated bushing 52 similar to the bushing 25.

The trailing end of the connector 50 has two barrels or locking ring chambers 53, 54. Each barrel or locking ring chamber 53, 54 has a locking ring 30 that may be identical to the locking ring 30 described above in connection with the embodiment of FIGS. 1-12.

In use, the cable/conduits are inserted into the locking rings 30 and the cable wires are pulled or pushed through the bushing 30.

Figure 16:
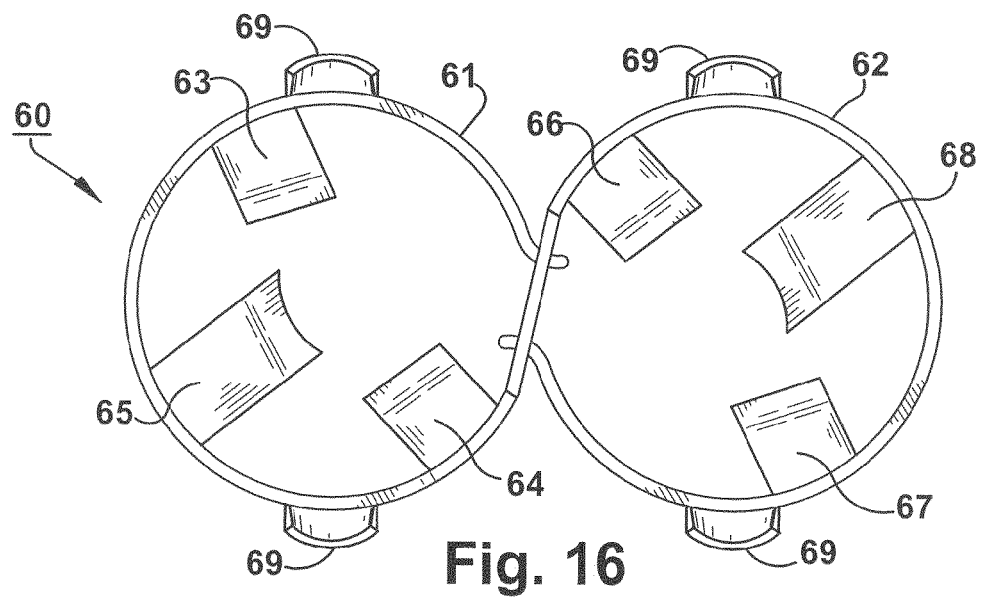
FIG. 16 is an end elevational view of a modified duplex locking ring made with the blank shown in FIGS. 14 and 15.

FIG. 16 illustrates a modified locking ring 60 for a duplex snap-in connector. The body of the duplex connector is not shown, but it may be same as shown in FIG. 13.

The duplex locking ring 60 has two cable receiving sections 61, 62. The section 61 has leading and trailing locking tabs 63, 64, respectively, and a middle tab 65. The locking ring section 62 has corresponding tabs 66-68. The tabs 63-68 are formed and located identically to the tabs 32-34 described above in connection with the embodiment of FIGS. 1-12.

Each locking ring section 61, 62 has outwardly extending locking tabs 69 that correspond in structure and function to the locking tabs 31 described in connection with the embodiment of FIGS. 1-12.

Figure 14:
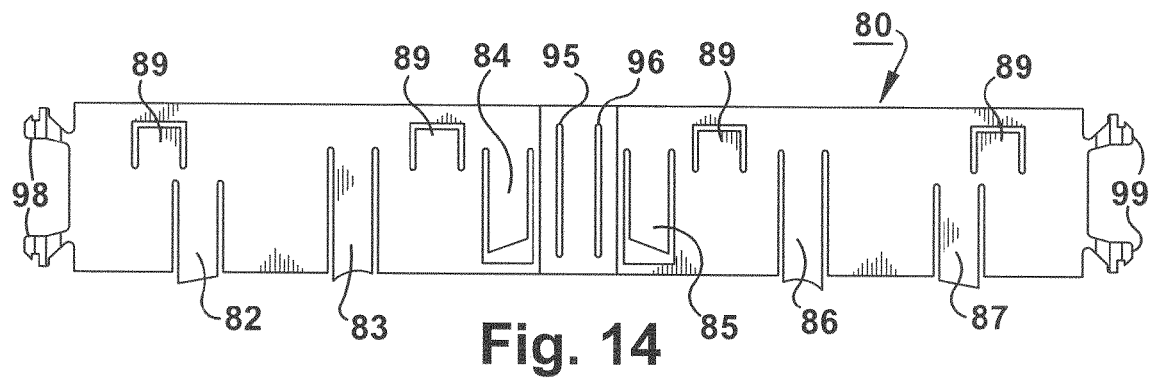
FIG. 14 is a plan view of a blank used in forming a modified duplex locking ring shown in FIG. 16.

FIG. 14 shows a spring steel blank 80 for the duplex ring 60. The blank 80 has tab forming portions 82-87 that are bent into the tabs 63-68, respectively, and locking tab forming portions 89 that correspond to the finally formed tabs 69.

Figure 15:
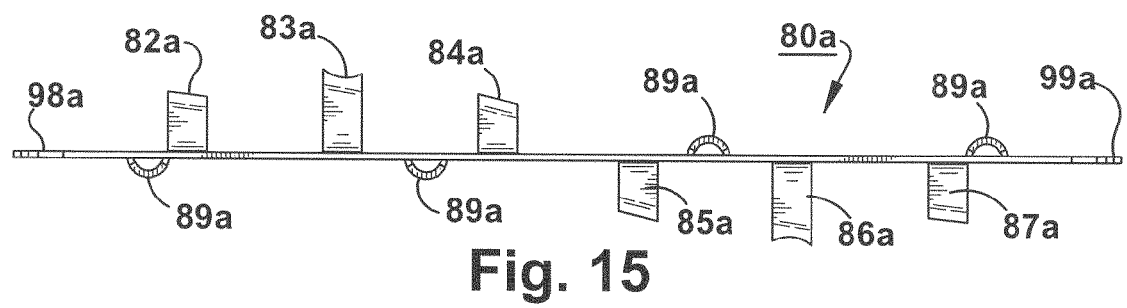
FIG. 15 is an edge elevational view of a partially formed blank used to make a duplex locking ring shown in FIG. 16.

The middle of the blank 80 has slots 95, 96 between the tab portions 84, 85. Locking fingers 98 extend from one end of the blank 80 and locking fingers 99 extend from the other end. When the blank 80 is fully formed and bent into a ring, the locking fingers 98 are inserted into the slot 96 and the locking fingers 99 are inserted into the slot 95 as shown in FIG. 15. FIG. 15 illustrates the blank 80 after being partially formed before being bent into the duplex shape of FIG. 16. In FIG. 15, the blank portions are given the same reference numerals as in FIG. 14 followed by the letter "a".

As previously described, the invention provides an improved snap-in electrical connector having better electrical conductivity and pull-out strength than previous designs. This objective is achieved by a combination of important features. The locking tabs are spaced apart axially of the connector so that they engage in a full range of helical metal cable and conduit of different diameters and types. The angle direction at the ends of the tabs, i.e. the angle between the tab and its leg portion, also is optimized to capture the helical groove over a range of cable diameters and types.

The angles of the tip ends with respect to the sides of the leg portions is optimized to engage the bottoms of the helical grooves in a range of cable/conduit sizes. The tip ends of the locking and trailing tabs will almost fully engage the groove bottoms of larger cables. The concave or scalloped tip of the middle tab provides two points of contact with the groove bottom of all sizes of cable/conduit, thereby enhancing electrical conductivity, strength and stability.

Further advantages will be apparent to those skilled in the art in light of the foregoing disclosure. Therefore, it is to be understood that, within the scope of the appended claims, the invention can be practiced otherwise that as specifically shown and described.

What is claimed is:

1. A snap-in electrical connector for helical metal cable and conduit comprising:
    a) a body having a leading end engageable in a hole of a junction box, a trailing end, and at least one locking ring chamber having a longitudinal axis,
    b) a spring steel locking ring in said chamber, said locking ring including outwardly extending locking tabs engaged in holes in said body, and three inwardly extending tabs including a trailing tab and a leading tab that extend toward each other and a middle tab between said trailing and leading tabs,
    c) each of said tabs having a leg extending inwardly of said chamber toward said leading end, a cable/conduit engaging tip bent at an angle with respect to said leg, and a tip end, said tip ends being spaced along said longitudinal axis of said chamber and being biased relative to said legs in the same angular direction so as to follow and engage the bottom of the helical groove of the cable/conduit when inserted into said body with said chamber.

2. A snap-in electrical connector as claimed in claim 1, wherein said tip ends are biased at an angle in a range from about 9°-20°.

3. A snap-in electrical connector as claimed in claim 2, wherein said tip end of said leading tab has a biased angle of about 10°, said tip end of said trailing tab has a biased angle of about 20°, and said tip end of said middle tab has a biased angle of about 9°.

4. A snap-in electrical connector as claimed in claim 1, wherein the tip end of said middle tab is concave so as to provide two points of engagement with the bottom of the helical groove of a cable/conduit.

5. A snap-in electrical connector as claimed in claim 1, wherein said middle tab is longer that said trailing and leading tabs.

6. A snap-in electrical connector as claimed in claim 1, wherein the leg of said middle tab is concavo-convex along its length.

7. A snap-in electrical connector as claimed in claim 1, including two locking ring chambers, each having one of said locking rings.

8. A snap-in electrical connector as claimed in claim 1, wherein locking ring has a thickness and hardness of about 0.020 gauge and 45-50 Rockwell C., and wherein said legs form included angles with said ring in the range of about 35°-55°.

9. A snap-in electrical connecter as claimed in claim 8, wherein the legs of said trailing and leading tabs form included angles of about 42°, and the leg of said middle tab forms an included angle of about 52°.

10. A snap-in electrical connector as claimed in claim 8, wherein said tips form included angles with said legs of about 135°.

11. A snap-in electrical connector as claimed in claim 1, wherein:
    i) the legs of said trailing and leading tabs form included angles with said ring of about 42°,
    ii) the leg of said middle tab forms an included angle with said ring of about 52°,
    iii) said tips of said tabs form included angles with their legs of about 135°,
    iv) the biased angle of said leading tab is about 10°,
    v) the biased angle of said trailing tab is about 20°,
    vi) the biased angle of the tip end of said middle tab is about 9°.

12. A snap-in electrical connector locking ring having a leading end, a trailing end and a longitudinal axis extending between said ends, said ring comprising outwardly extending, concavo-convex locking tabs and inwardly extending, cable/conduit tabs including a leading tab, and a trailing tab that extend toward each other and a middle tab between said leading and trailing tabs, each of said inwardly extending tabs including a leg projecting toward said leading end, a tip formed at an angle to said leg, and a tip end formed at an angle to said tip, said tip ends being biased in the same angular direction corresponding to the helical angle of a cable/conduit engage by said connector, and said inwardly extending tabs being spaced from each other along said longitudinal axis by a distance such that said tips can capture the helical groove of a metal cable and conduit with said biased end tips engaging the bottom of the groove.

13. A snap-in electrical connector locking ring as claimed in claim 12, wherein said middle tab is longer than said leading and trailing tabs, and is concavo-convex along its length, and wherein the tip end of said middle tab is concave.

* * * * *